(12) United States Patent
Karmakar et al.

(10) Patent No.: US 11,715,048 B2
(45) Date of Patent: Aug. 1, 2023

(54) SYSTEM AND METHOD FOR ITEM FACING RECOMMENDATION

(71) Applicant: Walmart Apollo, LLC, Bentonville, AR (US)

(72) Inventors: Somedip Karmakar, Kolkata (IN); Ashish Gupta, Karnataka (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/533,096

(22) Filed: Aug. 6, 2019

(65) Prior Publication Data

US 2020/0042914 A1 Feb. 6, 2020

Related U.S. Application Data

(60) Provisional application No. 62/773,582, filed on Nov. 30, 2018.

(30) Foreign Application Priority Data

Aug. 6, 2018 (IN) .............................. 201811029536

(51) Int. Cl.
*G06Q 10/0631* (2023.01)
*G06Q 10/087* (2023.01)
*G06Q 10/04* (2023.01)

(52) U.S. Cl.
CPC ......... *G06Q 10/0631* (2013.01); *G06Q 10/04* (2013.01); *G06Q 10/087* (2013.01)

(58) Field of Classification Search
None
See application file for complete search history.

(56) References Cited

U.S. PATENT DOCUMENTS 7,689,456 B2    3/2010  Schroeder et al.
7,734,495 B2    6/2010  Klaubauf et al.
(Continued)

FOREIGN PATENT DOCUMENTS

AU    2010202163 B2 * 10/2013 ......... G06Q 10/0637

OTHER PUBLICATIONS

L.K. Chu, An efficient approach for shelf space planning and display area allocation in convenience stores, 2009 IEEE, Department of Industrial and Manufacturing Systems Engineering, The University of Hong Kong, 874-878 (Year: 2009).*

(Continued)

*Primary Examiner* — Shelby A Turner
*Assistant Examiner* — Matthew H Divelbiss
(74) *Attorney, Agent, or Firm* — Morgan, Lewis & Bockius LLP; Manita Rawat

(57) ABSTRACT

A method for computer modeling a retail environment includes: calculating a space elasticity for an item of an item category in a retail store, using a constrained linear regression model; calculating a cross-space elasticity for the item of the item category in the retail store, using a multiple regression model; generating a number for horizontal facings for the item of the item category in the retail store, using a non-linear multiple-constraint mixed integer optimization model, based on the space elasticity of the item and the cross-space elasticity of the item; and generating an electronic planogram of the item category for the retail store, based on the number of the horizontal facings of the item.

20 Claims, 6 Drawing Sheets

(56) References Cited

U.S. PATENT DOCUMENTS

| | | | |
|---|---|---|---|
| 8,032,406 B2 | 10/2011 | Ouimet | |
| 8,108,249 B2 | 1/2012 | Schroeder | |
| 8,838,469 B2 | 9/2014 | Bottom | |
| 2003/0200129 A1 | 10/2003 | Klaubauf et al. | |
| 2004/0059560 A1 | 3/2004 | Gardner et al. | |
| 2007/0050235 A1* | 3/2007 | Ouimet | G06Q 30/0201 705/7.29 |
| 2008/0288327 A1 | 11/2008 | Watarai et al. | |
| 2010/0318403 A1* | 12/2010 | Bottom | G06Q 30/0202 706/54 |
| 2011/0035257 A1 | 2/2011 | Solanki et al. | |
| 2012/0317059 A1 | 12/2012 | Joshi et al. | |
| 2014/0025420 A1 | 1/2014 | Joshi et al. | |
| 2014/0058781 A1* | 2/2014 | Padmanabhan | G06Q 30/0202 705/7.22 |
| 2014/0289009 A1 | 9/2014 | Campbell | |
| 2014/0324532 A1 | 10/2014 | Ghosh et al. | |
| 2015/0248630 A1 | 9/2015 | Ramanan et al. | |
| 2015/0379532 A1* | 12/2015 | Liu | G06Q 30/0202 705/7.29 |
| 2016/0335586 A1 | 11/2016 | Panchamgam | |
| 2017/0116624 A1 | 4/2017 | Moore et al. | |
| 2020/0410376 A1 | 12/2020 | Zhou et al. | |

OTHER PUBLICATIONS

International Search Report and Written Opinion dated Oct. 11, 2019 in International Application No. PCT/US2019/045309.

Chandon et al., "Does In-Store Marketing Work? Effects of the Number and Position of Shelf Facings on Brand Attention and Evaluation at the Point of Purchase", Journal of Marketing, Nov. 2009, pp. 1-17, vol. 73, retrieved Nov. 12, 2019 from https://faculty.insead.edu/pierre-chandon/documents/JM_Chandon%20does%20in-store%20marketing%20work%20JM%2009.pdf.

Drèze et al., "Shelf management and Space Elasticity", Journal of Retailing, pp. 301-326, 70(4), retrieved Nov. 12, 2019 from http://repository.upenn.edu/cgi/viewcontent.cgi?article=1441&context=marketing_papers.

Hansen et al., "Retail Shelf Allocation: A Comparative Analysis of Heuristic and Meta-Heuristic Approaches", Journal of Retailing, 2010 pp. 94-105, 86(1), retrieved Nov. 12, 2019 from https://www.sciencedirect.com/science/article/abs/pii/S0022435910000060.

Maria Teresa Peixoto Braga Bianchi de Aguiar, "The Retail Shelf Space Allocation Problem: New Optimization Methods Applied to a Supermarket Chain", 2015, pp. 1-154.

Ruibin Bai Research, "Shelf space allocation", pp. 1-4.

Manu Krishna, "The new space race: How data science can determine how much shelf space to assign each product", Nov. 2017, Trax, pp. 1-6.

Jens Irion, Jye-Chyi Lu, Faiz Al-Khayyal, Yu-Chung Tsao, A piecewise linearization framework for retail shelf space management models, European Journal of Operational Research, vol. 222, Issue 1, 2012, pp. 122-136, ISSN 0377-2217, https://doi.org/10.1016/j.ejor.2012.04.021 (Year: 2012).

International Search Report and Written Opinion dated Oct. 22, 2019 in corresponding International Application No. PCT/US2019/045308.

Schaal, et al., "What does cross-space elasticity matter in shelf-space planning? A decision analytics approach", Omega, 2018, 80:135-152.

* cited by examiner

SYSTEM AND METHOD FOR ITEM FACING RECOMMENDATION

CROSS-REFERENCE TO RELATED APPLICATIONS

This patent application claims the priority to Indian Provisional Application No. 201811029536, filed Aug. 6, 2018, and U.S. Provisional Application No. 62/773,582, filed Nov. 30, 2018, contents of which are incorporated by reference herein.

BACKGROUND

1. Technical Field

The present disclosure relates to space planning, and more specifically to a system and method for item facing recommendation.

2. Introduction

Shelf space is a scarce resource for a retailer. Shelf space allocation may involve the distribution of appropriate amount of shelf space among different products, together with their locations, in a store in such a way that the total profits and/or customer satisfaction may be maximized. Due to the limited shelf space, planograms may be one of the most important aspects that are used to improve financial performance. Planograms are a subset of the wider domain of space planning which may include more well-known research areas such as bin packing and knapsack problems. Electronic planograms can be also used for inventory control and vendor relation improvement. Further, a computer system for managing the shelf space can run inefficiently due to undesirable space planning. In addition, existing computer models for generating electronic planograms are inefficient and inaccurate.

There is a need for correlating relationship between space and sales both individually for each item as well as their inter-relationships to maximize total profit of items in an item category, and to improve the computer system for managing the shelf space.

SUMMARY

A method of computer modeling a retail environment for performing concepts disclosed herein can include calculating a space elasticity for an item of an item category in a retail store, using a constrained linear regression model; calculating a cross-space elasticity for the item of the item category in the retail store, using a multiple regression model; generating a number for horizontal facings for the item of the item category in the retail store, using a non-linear multiple-constraint mixed integer optimization model, based on the space elasticity of the item and the cross-space elasticity of the item; and generating an electronic planogram of the item category for the retail store, based on the number of the horizontal facings of the item.

A system of computer modeling a retail environment configured as disclosed herein can include: a processor; and a computer-readable storage medium having instructions stored which, when executed by the processor, cause the processor to perform operations comprising: calculating a space elasticity for an item of an item category in a retail store, using a constrained linear regression model; calculating a cross-space elasticity for the item of the item category in the retail store, using a multiple regression model; generating a number for horizontal facings for the item of the item category in the retail store, using a non-linear multiple-constraint mixed integer optimization model, based on the space elasticity of the item and the cross-space elasticity of the item; and generating an electronic planogram of the item category for the retail store, based on the number of the horizontal facings of the item.

A non-transitory computer-readable storage medium configured as disclosed herein can have instructions stored which, when executed by a computing device, cause the computing device to perform operations which include: calculating a space elasticity for an item of an item category in a retail store, using a constrained linear regression model; calculating a cross-space elasticity for the item of the item category in the retail store, using a multiple regression model; generating a number for horizontal facings for the item of the item category in the retail store, using a non-linear multiple-constraint mixed integer optimization model, based on the space elasticity of the item and the cross-space elasticity of the item; and generating an electronic planogram of the item category for the retail store, based on the number of the horizontal facings of the item.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Systems, methods, and computer-readable storage media configured according to this disclosure are capable of recommending item facings in an item category, which may provide a process for arranging items on shelves in a retail store. Optimized item facings using conventional methods can be recommended to increase the overall revenue in the category. However, different items may behave differently in terms of change in sales for similar change in facings. Also the items in the category can influence each other positively or negatively in terms of change in demand. This may lead to learn the relationship between space and sales both individually for each item as well as their inter-relationships. As used herein, the "sale" and "demand" are interchangeable. The "item facings" may refer to the number of the item displayed on a fixture (e.g., a shelf) in a retail store.

Various specific embodiments of the disclosure are described in detail below. While specific implementations are described, it should be understood that this is done for illustration purposes only. Other components and configurations may be used without parting from the spirit and scope of the disclosure, and can be implemented in combinations of the variations provided. These variations shall be described herein as the various embodiments are set forth.

When creating a planogram, allocation of item horizontal facings may be one of the primary areas of focus. However, the display space allocated to an item may have a different influence on sales with respect to different items. In some embodiments, optimization using space elasticity may be provided. As used herein, item space elasticity may be defined to indicate a relationship between retail space allocation of the item and observed demand of the item. That is, the measurement of the impact on a product's sales performance by increasing or decreasing its allocation of space, for example, within a shelf, may be reflected by the space elasticity of the product. Space elasticity may be impacted by many variables, including types of product, brands, price, seasonality, etc. A high space elasticity value may indicate that the product sales can be greatly affected by change in space allocation of the product. As used herein, the terms "product" and "item" are interchangeable.

Figure 1:
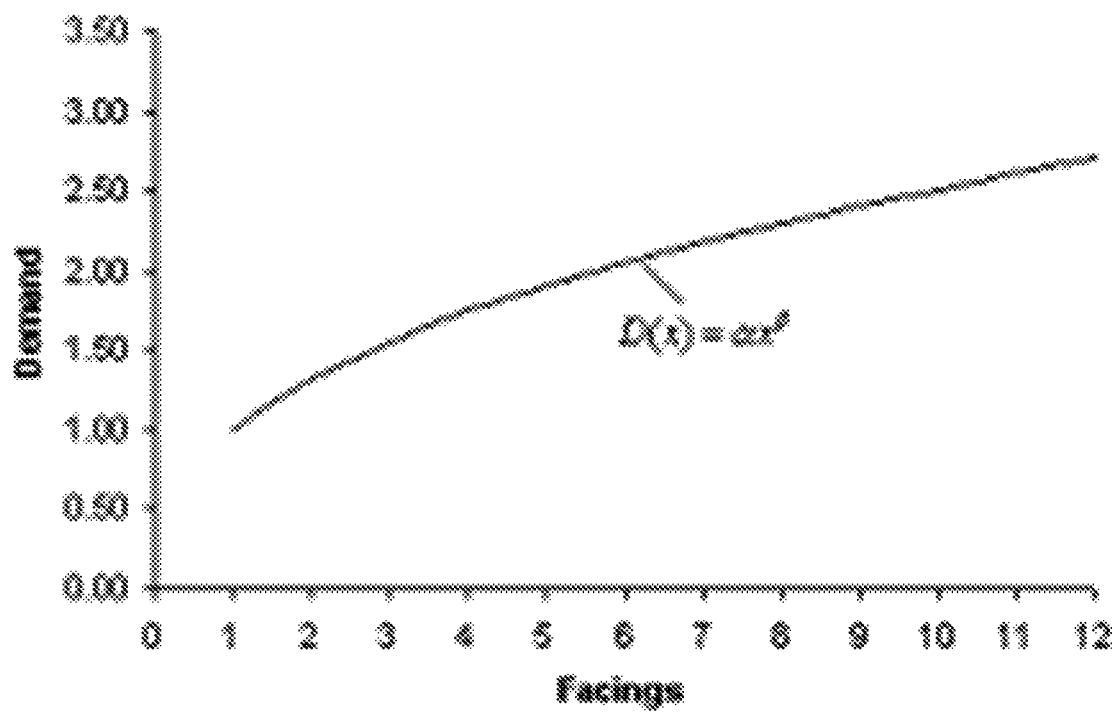
FIG. 1 illustrates an exemplary diagram of an assumed model correlating item facings and demand, according to one embodiment of the present disclosure.

Item space elasticity may enable retailers to map demand data against space variables and generate the associated space elasticity of demand curves. FIG. 1 illustrates an exemplary diagram of a model correlating item facings and demand based on item space elasticity, according to one embodiment of the present disclosure. The model may take a general form as sales share (demand)~function (elasticity, space share).

In this embodiment, the model may take a polynomial form. For the ith item:

$$D(i)=a(i)*(x(i)^{\wedge}b(i)), \text{ where } a=>0, \text{ and } 0<=b<=1$$

where $D(i)$ is the demand share of the ith product, $x(i)$ is the number of horizontal facings of ith product, $a(i)$ is a scale parameter, $b(i)$ is the space elasticity of the product. As can be seen from FIG. 1, the sales of the ith item may increase with an increase in the space allocated (facings) of the ith item, but the rate of increase may diminish gradually.

In some embodiments, through a transformation, the above model form may be written as: $Log(D(i))=log(a(i))+b(i)*log(x(i))$, so that the parameters (i.e., a and b) can then be estimated by a constrained linear regression (i.e., $a=>0$, and $0<=b<=1$).

Other variables may also impact the demand of an item, such as store location, shelf height. The above model may be expanded to include an effect of the total modular footage per shelf and the number of shelves of a retailer store. Other explanatory variables like store clusters may also be added to improve the model. For example, let L and S denote the linear footage of a shelf and the number of shelves of the store, and $c(i)$ and $d(i)$ are parameters indicating effects of the linear footage L and the number S of shelves on the sales, respectively, the updated model may be $\log(D(i))=\log(a(i))+b(i)*\log(x(i))+c(i)*\log(L)+d(i)*\log(S)$, which may be subject to constraints: $0<=b(i)<=1$. Thus, item space elasticity may be measured, mapped and utilized to enable retailers to predict profit return on space.

In some embodiments, the actual sales data of items may be validated against the model assumptions to check the proportion of conformity of the model, and accordingly the variables/parameters may be updated to improve the model's validation and accuracy. The proportion of conformity can measure the items for which, unconstrained regression model parameter estimates, conform or match with the model assumptions of $a>0$, $0<b<1$.

In other embodiments, instead of the actual sales, the category share of sales and share of space may be used for examining compliance of a model. Specifically, instead of regressing the logarithm of actual category sales on logarithm of actual category space, the share of sales and space are used. For example, a category X has sales of $20M, and has 10 items. Item 1 has sales $1M, so item 1 has a share of sales 1/20, i.e. 5% sales share. Similarly out of 20 ft allocated to category X, 2 ft is allocated to item 1, so the item 1 has 2/20, i.e. 10% space share. Using these modified features, improved accuracy and model conformity can be obtained.

Also the model mentioned above can be simplified to the following two cases: effect of total space instead of separated effects of number of shelves and footage per shelf, i.e., $c(i)=d(i)$; and elasticity calculated as effect of space share, i.e., $c(i)=d(i)=-b(i)$. The parameters c and d represent the effects of number of shelves and shelf footages. When the share of space instead of the actual space is considered, a new variable is created: space share=facings/(number of shelves*shelf footages). So inherently the unknown variables c and d are the same in magnitude as the elasticity parameter b and of opposite sign. For a set of universal product codes (UPCs), the UPCs that demonstrate the model's compliance (referred to as the compliant UPCs), may be analyzed using a linear regression model, while constrained regression may be used for the other UPCs that do not demonstrate the model's compliance. The results can be validated on items of a category of UPCs, as shown in Table 1 below.

| Model Variables | Compliance |
| --- | --- |
| Total Sales | 11% |
| Sales Share | 54% |
| Total space | 62% |
| Share of facings | 80% |

Figure 2:
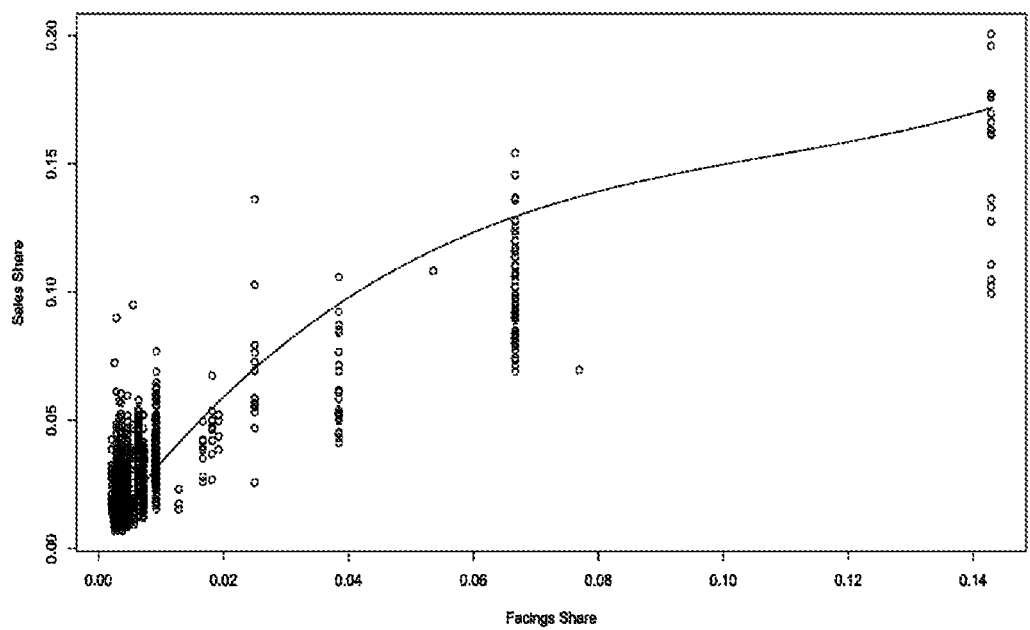
FIG. 2 illustrates an exemplary diagram of a modified model correlating item facings and demand, based on actual data, according to one embodiment of the present disclosure.

FIG. 2 illustrates an exemplary diagram of a modified model correlating item facings and demand, based on actual data, according to one embodiment of the present disclosure. As can be seen from FIG. 2, the model fits the data well. By fitting this model on the data, the space elasticity of each item in a category may be estimated, with the constraint of $0<=$space elasticity of time$<=1$.

Figure 3:
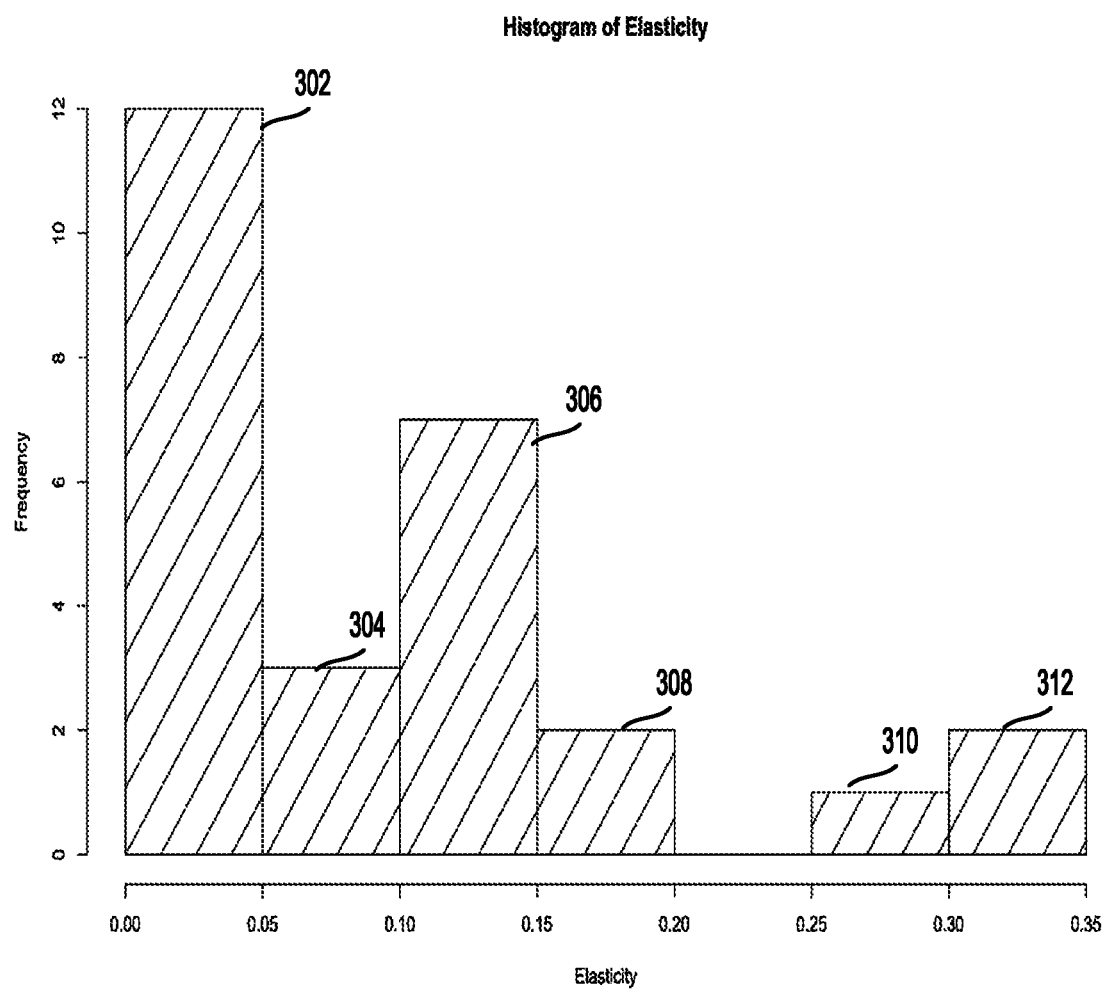
FIG. 3 illustrates an exemplary histogram of item elasticity calculated using a model, according to one embodiment of the present disclosure.

FIG. 3 illustrates an exemplary histogram of item elasticity calculated using a model, according to one embodiment of the present disclosure. In this embodiment, 27 UPCs are used to fit the model, the distribution of elasticity results are as shown in FIG. 3. As can be seen, 12 UPCs have a space elasticity value ranging from 0 to 0.05 (302); 3 UPCs have a space elasticity value ranging from 0.05 to 0.1 (304); 7 UPCs have a space elasticity value ranging from 0.1 to 0.15 (306); 2 UPCs have a space elasticity value ranging from 0.15 to 0.20 (308); 1 UPCs has a space elasticity value ranging from 0.25 to 0.30 (310); and 2 UPCs have a space elasticity value ranging from 0.3 to 0.35 (312). This model may explain about 74% of the variability on demand on an average.

The relative change in sales of an item may be very much dependent on the space allocated to that item. But the space allocated to the other items in the same category can also have some influence over it. That is, the space allocated to items in a category may influence each other positively or negatively in terms of change in demand. To take into this effect, a cross-space elasticity of the item may be used in determining space allocation. As used herein, the cross-space elasticity may be referred to as a change in demand of one item in response to the change in space of the other item.

Typically, substitutes may have a negative cross-space elasticity on an item, whereas complements (or variety substitutes) may have a positive cross-space elasticity on an item. For example, in a category of sports drink, the cross-space elasticity of STOLICHNAYA VODKA on ABSOLUT VODKA (traditional substitute) can be −0.0282 and the same on EDINBURGH GIN (variety substitute) can be 0.00946.

In some embodiments, the model for calculation for space elasticity of an item in a category may be expanded to a multiple regression problem by including the facing allocations of the other items in the category as features. This may transform the demand model to a parameter-heavy complex model, which can be solved using least absolute shrinkage and selection operator (LASSO) regression, to avoid over-fitting. In addition, the variable-selection property of this model may be beneficial in picking out the relatively important items which influence the demand of the target item. For some embodiments, on an average, this model can explain 89% variability in demand shares.

Figure 4:
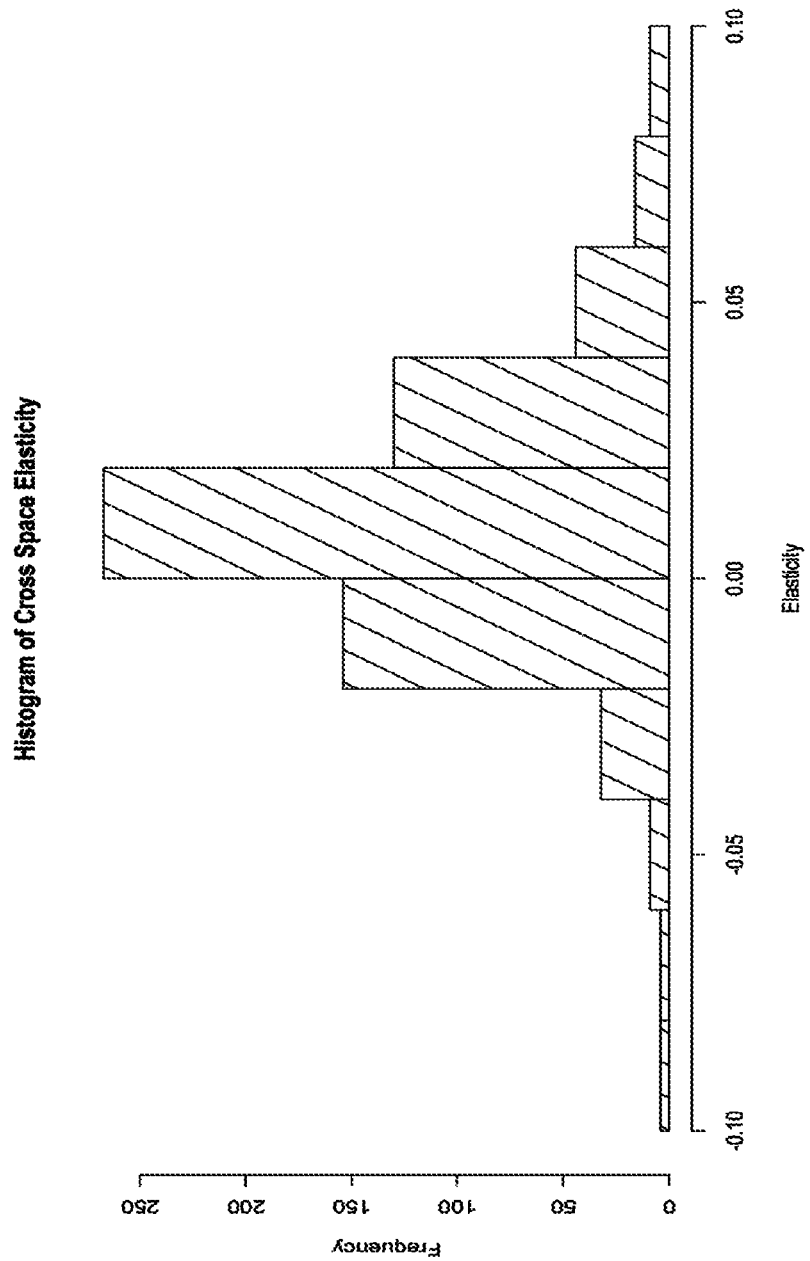
FIG. 4 illustrates an exemplary histogram of item cross-space elasticity calculated using a model, according to one embodiment of the present disclosure.

FIG. 4 illustrates an exemplary histogram of item cross-space elasticity calculated using a model, according to one embodiment of the present disclosure. As can be seen from FIG. 4, some items have negative cross-space elasticity on other items of the same category; some items have positive cross-space elasticity on other items of the same category. As defined the above, a negative cross-space elasticity may indicate that demand for an item of the category may be negatively affected by its replacement with another item of the same category. Similarly, a positive cross-space elasticity may indicate that demand for an item of the category may be positively affected by its replacement with another item of the same category.

The space elasticity and cross-space elasticity may then be used to determine the optimal number of items on the shelf, that is, to determine item facings. The number of horizontal facings for each item that can increase the overall revenue of the category, is the desired result. For determining the optimal number of facings, the vertical and depth facings of items may be assumed as constant for each item based on the shelf space availability of the store. The following non-linear, multi-constraint optimization problem can be solved to arrive at these recommendations:

Maximize:

$$R = \sum_{i=1}^{n} \left( p_i a_i \left(\frac{x_i}{L*S}\right)^{b_i} \prod_{j=1 \neq i}^{n} \left(\frac{x_j}{L*S}\right)^{g_{ij}} \right),$$

that is, total revenue R of the category may be maximized. The total revenue R can refer to as a sum of unit price of each item * demand for each item.

where, $\sum_{i=1}^{n} x_i f_i = L*S$, L is a vector having elements L that is the total linear footage per shelf, and S is a vector having elements S that is the number of shelves. That is, L*S represents a sum of total allocated space for items of the category that is equal to the total available space.

$lb_i <= x_i <= ub_i$ may indicate that horizontal facings of ith item may be bounded by business constraints.

$x_i$'s are positive integers, $p_i$ is the unit price, $x_i$ is the horizontal facings, $f_i$ is the front-facing length of $i^{th}$ item, L is the total linear footage per shelf and S is the number of shelves. $a_i$, $b_i$ are parameters which were solved in the earlier elasticity model and $g_{ij}$ is the cross-space elasticity of ith item on jth item.

$lb_i$ and $ub_i$ are respectively the lower and upper bounds of horizontal facings of the ith item.

The lower and upper bounds can be derived from business constraints. For one example, 1.5 case pack and 3.5 Days of Supply (DOS) and 1 DOS safety stock may be used as constraints, to eliminate over-stock and out-of-stock situations:

$$lb_i = \left\lceil \frac{\max(1.5\ CP, 1\ DOS\ \text{units})}{vf_i df_i} \right\rceil,$$

$$ub_i = \left\lceil \frac{\max(1.5\ CP, 4.5\ DOS\ \text{units})}{vf_i df_i} \right\rceil + 1$$

where 1 DOS units=median of (historical) daily sales, and $vf_i$ and $df_i$ are respectively the vertical and depth facings of the ith item for the chosen modular plan.

Figure 5:
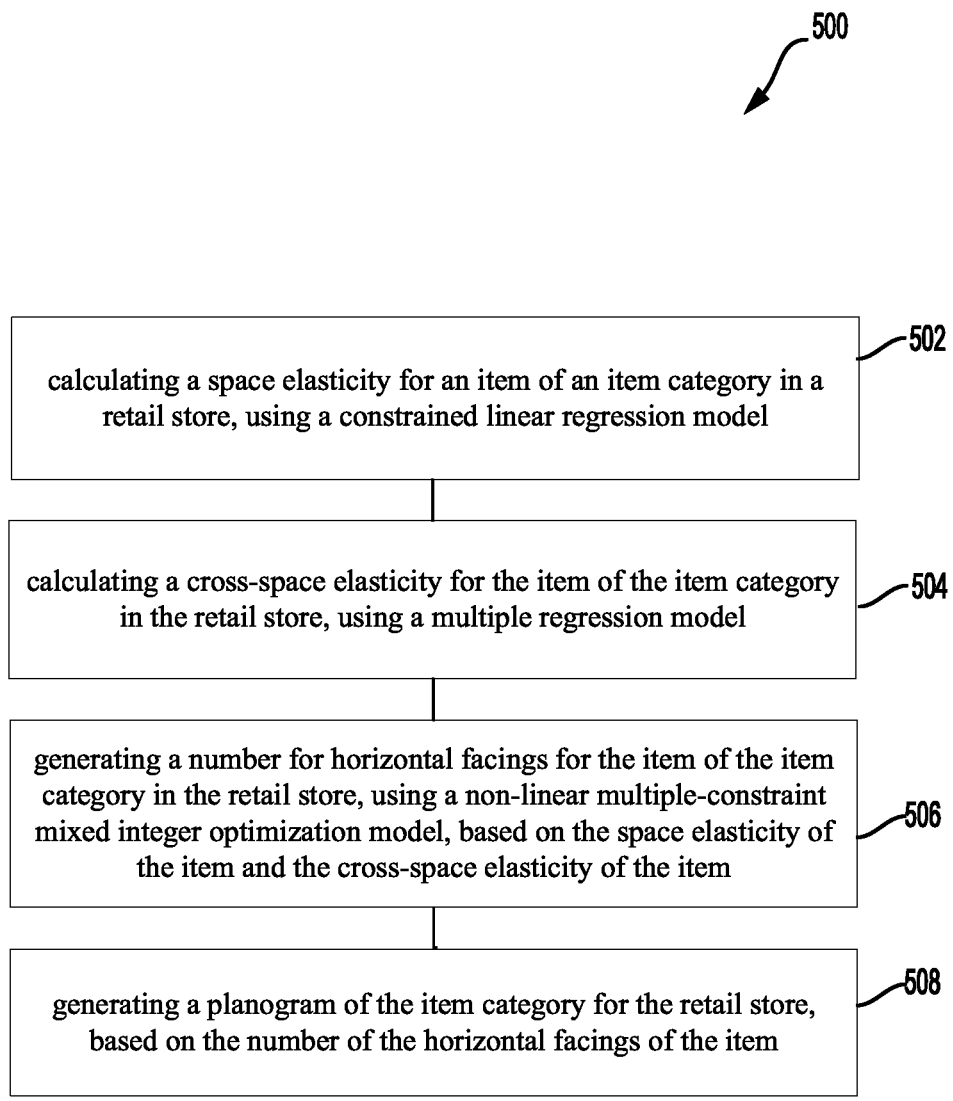
FIG. 5 illustrate an exemplary method of recommending item facings in an item category.

FIG. 5 illustrate an exemplary method 500 of recommending item facings in an item category. An item of interest is identified. The space elasticity for the item is determined. Cross-space elasticity for the item is determined. The space elasticity and cross space elasticity are the used to determine the optimal number of items on the shelf. The method 500 may be implemented in the above disclosed systems, may include the following steps, and thus some details may be repeated herein.

At step 502, a space elasticity for an item of an item category in a retail store is calculated, using a constrained linear regression model. The constrained linear regress model may comprise Log(D)=log(a)+b*log(x), wherein D is a demand of the item, x is a number of horizontal facings of the item on one or more shelves in the retail store, a is a scale parameter being =>0, and b is the space elasticity of the item being 0<=b<=1. The constrained linear regression model may further comprise parameters including a linear horizontal footage of the self and a number of the shelves. In addition, the constrained linear regression may further comprise parameters including clusters of the retail store.

At step 504, a cross-space elasticity for the item of the item category in the retail store is calculated, using a multiple regression model. The multiple regression model may be derived from the constrained linear regression model by including horizontal facing allocations of other items of the item category. The multiple regression model may be solved using least absolute shrinkage and selection operator (LASSO) regression analysis method, such that over-fitting of the multiple regression model is avoided, and relatively important items of the item category which influence a demand of the item of the item category.

At step 506, a number for horizontal facings for the item of the item category in the retail store may be generated, using a non-linear multiple-constraint mixed integer optimization model, based on the space elasticity of the item and the cross-space elasticity of the item. The non-linear multiple-constraint mixed integer optimization model may be solved using genetic algorithm.

The non-linear multiple-constraint mixed integer optimization model may comprise $$R = \sum_{i=1}^{n} \left( p_i a_i \left(\frac{x_i}{L*S}\right)^{b_i} \prod_{j=1 \neq i}^{n} \left(\frac{x_j}{L*S}\right)^{g_{ij}} \right),$$

wherein: $p_i$ is a unit price of an ith item in the item category, $x_i$ is horizontal facings of the ith item and is a positive number, L is a linear footage per shelf, S is a number of shelves for the item category, $a_i$, $b_i$ are parameters which are solved using the constrained linear regression model, $g_{ij}$ is a cross-space elasticity of the ith item on a jth item solved using the multiple regression model; and $lb_i <= x_i <= ub_i$ in which $lb_i$ and $ub_i$ are respectively lower and upper bounds of horizontal facings of the ith item.

In some embodiments, the lower and upper bounds are derived from the business constraints of 1.5 case pack and 3.5 days of supply (DOS), and 1 DOS safety stock, to eliminate over-stock and out-of-stock situations:

$$lb_i = \left\lceil \frac{\max(1.5\ CP, 1\ DOS\ \text{units})}{vf_i df_i} \right\rceil,$$

$$ub_i = \left\lceil \frac{\max(1.5\ CP, 4.5\ DOS\ \text{units})}{vf_i df_i} \right\rceil + 1,$$

in which 1 DOS units=median of (historical) daily sales, vf, and df, are respectively vertical and depth facings of the ith item for the shelf.

A planogram of the item category for the retail store may be generated per step 508, based on the number of the horizontal facings of the item. Such planogram may maximize the revenue R of all items in the same category, as described the above.

Example results by using the above systems and methods are demonstrated on a sample of 65 UPCs. The facing optimization are carried out for 78 modules linked to 301 stores. The projected revenue is demonstrated to have 3.5% gain with 48% change in facing allocation and 99.6% average area covered.

Figure 6:
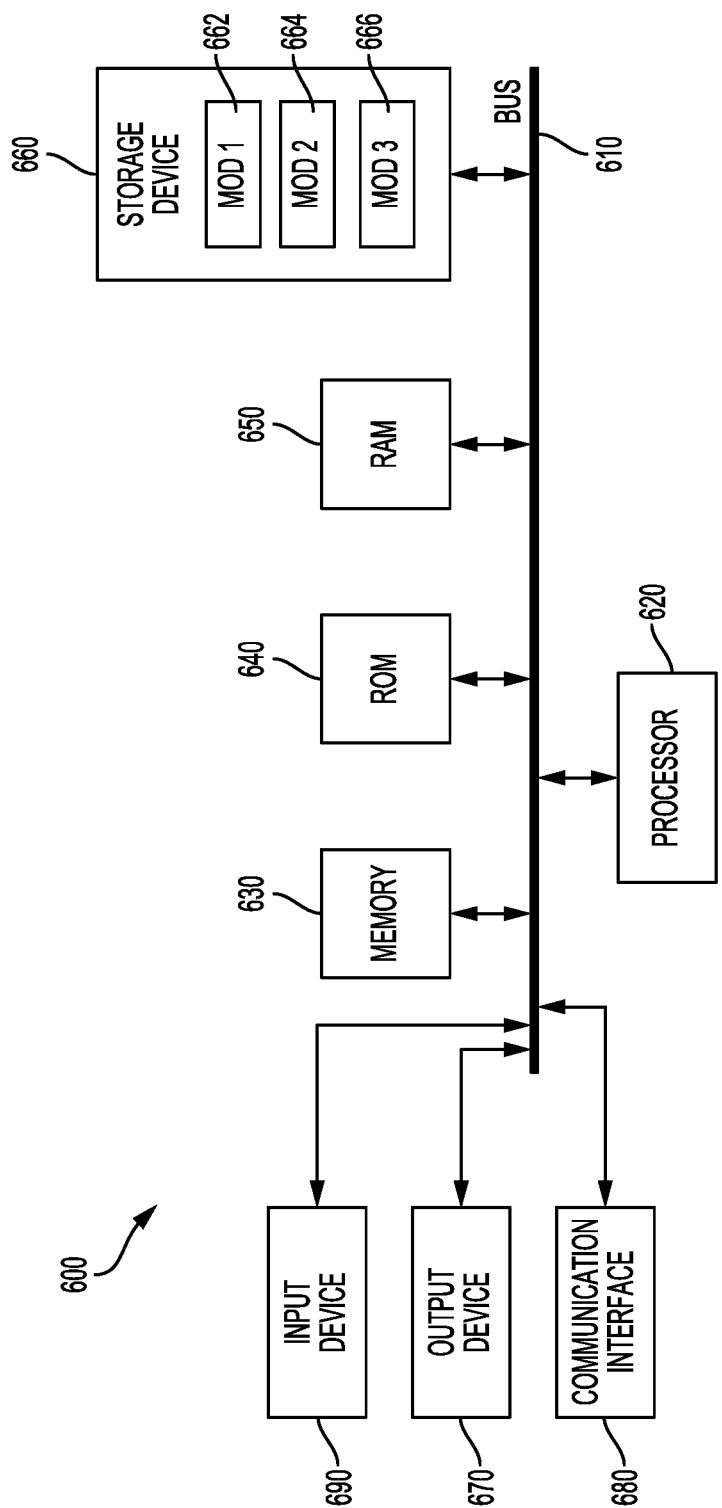
FIG. 6 illustrates an exemplary computer system.

FIG. 6 illustrates an exemplary computer system or device that may perform the above systems and methods. With reference to FIG. 6, an exemplary system 600 can include a processing unit (CPU or processor) 620 and a system bus 610 that couples various system components including the system memory 630 such as read only memory (ROM) 640 and random access memory (RAM) 650 to the processor 620. The system 600 can include a cache of high speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing system 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing system 600, such as during start-up. The computing system 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing system 600. In one aspect, a hardware module that performs a particular function includes the software component stored in a tangible computer-readable storage medium in connection with the necessary hardware components, such as the processor 620, bus 610, output device 670 as display, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the system 600 is a small, handheld computing device, a desktop computer, or a computer server.

Although the exemplary embodiment described herein employs the hard disk as the storage device 660, other types of computer-readable media which can store data that are accessible by a computer, such as magnetic cassettes, flash memory cards, digital versatile disks, cartridges, random access memories (RAMs) 650, and read only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing system 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing system 600. The communications interface 680 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method for computer modeling a retail environment, comprising:
   determining, via a processor, items of an item category;
   generating, via the processor, a constrained linear regression model based on item demand and shelf-space of an item of the items;
   generating, via the processor, space elasticity data by fitting the constrained linear regression model on the item demand of the item and a horizontal footage of the shelf-space associated with the item, wherein the item is a compliant item with respect to the constrained linear regression model;
   generating, via the processor, a multiple non-linear regression model based on the constrained linear regression model, the item demand and an amount of non-zero shelf-space of other items of the items in the retail environment, the other items of the items in the retail environment including one or more replacement items of the item and each of the one or more replacement items being associated with either a substitute item or a complementary item, and wherein at least one of the one or more replacement items is a non-compliant item with respect to the constrained linear regression model;
   generating, via the processor, cross-space elasticity data using the multiple non-linear regression model, the cross-space elasticity data indicating: (i) an increase in the item demand of the item in response to an increase in shelf-space of a first item of the other items in the item category, (ii) a decrease in the item demand of the item in response to an increase in shelf-space of a second item of the other items in the item category, (iii) a positive value representing a degree of the increase in the item demand of the item in response to the increase in shelf-space of the first item of the other items, and (iv) a negative value representing a degree of the decrease in the item demand of the item in response to the increase in shelf-space of the second item of the other items;
   generating, via the processor, a non-linear multiple-constraint mixed integer optimization model based on the space elasticity data of the item and the cross-space elasticity data of the item;
   generating, via the processor, a number of horizontal facings, using the non-linear multiple-constraint mixed integer optimization model, based on the space elasticity data of the item and the cross-space elasticity data of the item;
   generating, via the processor, an electronic planogram of the item category, based on the number of horizontal facings associated with the item; and
   arranging the items in the retail environment according to the electronic planogram.

2. The method of claim 1, wherein the constrained linear regression model comprises Log(D)=log(a)+b*log(x), wherein D is the item demand of the item, x is the number of horizontal facings for the item on one or more shelves in the retail environment, a is a scale parameter being =>0, and b is the space elasticity of the item being 0<=b<=1.

3. The method of claim 1, wherein the multiple non-linear regression model is derived from the constrained linear regression model by including horizontal facing allocations of the other items of the item category.

4. The method of claim 3, wherein generating the multiple non-linear regression model includes least absolute shrinkage and selection operator (LASSO) regression analysis method.

5. The method of claim 1, wherein the constrained linear regression model further comprises parameters including a linear horizontal footage of a shelf and a number of shelves.

6. The method of claim 1, wherein the constrained linear regression further comprises parameters including clusters of the retail environment.

7. The method of claim 1, wherein generating the non-linear multiple-constraint mixed integer optimization model includes utilizing a genetic algorithm.

8. The method of claim 1, wherein the non-linear multiple-constraint mixed integer optimization model comprises $$R = \sum_{i=1}^{n} \left( p_i a_i \left(\frac{x_i}{L*S}\right)^{b_i} \prod_{j=1\ne i}^{n} \left(\frac{x_j}{L*S}\right)^{g_{ij}} \right),$$

wherein:
   $p_i$ is a unit price of an ith item in the item category, $x_i$ is horizontal facings of the ith item and is a positive number, L is a linear footage per shelf, S is a number of shelves for the item category, $a_i$, $b_i$ are parameters which are solved using the constrained linear regression model, $g_{ij}$ is a cross-space elasticity of the ith item on a jth item that is determined utilizing the multiple non-linear regression model; and
   $lb_i <= x_i <= ub_i$ in which $lb_i$ and $ub_i$ are respectively lower and upper bounds of horizontal facings of the ith item.

9. The method of claim 8, wherein the lower and upper bounds are derived from business constraints of 1.5 case pack and 3.5 days of supply (DOS), and 1 DOS safety stock, to eliminate over-stock and out-of-stock situations:

$$lb_i = \left\lceil \frac{\max(1.5\ CP, 1\ DOS\ \text{units})}{vf_i df_i} \right\rceil$$

$$ub_i = \left\lceil \frac{\max(1.5\ CP, 4.5\ DOS\ \text{units})}{vf_i df_i} \right\rceil + 1$$

in which 1 DOS units=median of historical daily sales, $vf_i$ and $df_i$ are respectively vertical and depth facings of the ith item for the shelf.

10. A system for computer modeling a retail environment, comprising:
   a processor;
   a memory resource storing instructions that when executed by the processor, causes the processor to:
      determine items of an item category;
      generate a constrained linear regression model based on item demand and shelf-space of an item of the items;
      generate space elasticity data by fitting the constrained linear regression model on the item demand of the item and a horizontal footage of the shelf-space associated with the item, wherein the item is a compliant item with respect to the constrained linear regression model;
      generate a multiple non-linear regression model based on the constrained linear regression model, the item demand and an amount of non-zero shelf-space of other items of the items in the retail environment, the other items of the items in the retail environment including one or more replacement items of the item and each of the one or more replacement items being associated with either a substitute item or a complementary item, and wherein at least one of the one or more replacementitems is a non-compliant item with respect to the constrained linear regression model;

generate cross-space elasticity data using the multiple non-linear regression model, the cross-space elasticity data indicating: (i) an increase in the item demand of the item in response to an increase in shelf-space of a first replacement item of the one or more replacement items in the item category, (ii) a decrease in the item demand of the item in response to an increase in shelf-space of a second replacement item of the one or more replacement items in the item category, (iii) a positive value representing a degree of the increase in the item demand of the item in response to the increase in shelf-space of the first replacement item, and (iv) a negative value representing a degree of the decrease in the item demand of the item in response to the increase in shelf-space of the second replacement item;

generate a non-linear multiple-constraint mixed integer optimization model based on the space elasticity data of the item and the cross-space elasticity data of the item;

generate a number of horizontal facings for the item of the items in the retail environment, using the non-linear multiple-constraint mixed integer optimization model, based on the space elasticity data of the item and the cross-space elasticity data of the item;

generate an electronic planogram of the item category for the retail environment, based on the number of horizontal facings associated with the item; and arrange the items in the retail environment according to the electronic planogram.

11. The system of claim 10, wherein the constrained linear regression model comprises $\text{Log}(D)=\log(a)+b*\log(x)$, wherein D is the item demand of the item, x is the number of horizontal facings for the item on one or more shelves in the retail environment, a is a scale parameter being $=>0$, and b is the space elasticity of the item being $0<=b<=1$.

12. The system of claim 10, wherein the multiple non-linear regression model is derived from the constrained linear regression model by including horizontal facing allocations of the other items of the item category.

13. The system of claim 12, wherein generating the multiple non-linear regression model includes utilizing a least absolute shrinkage and selection operator (LASSO) regression analysis method.

14. The system of claim 10, wherein the constrained linear regression model further comprises parameters including a linear horizontal footage of a shelf and a number of shelves.

15. The system of claim 10, wherein the constrained linear regression further comprises parameters including clusters of the retail environment.

16. The system of claim 10, wherein generating the non-linear multiple- constraint mixed integer optimization model includes utilizing genetic algorithm.

17. The system of claim 10, wherein the non-linear multiple-constraint mixed integer optimization model comprises $$R = \sum_{i=1}^{n} \left( p_i a_i \left(\frac{x_i}{L*S}\right)^{b_i} \prod_{j=1, \ne i}^{n} \left(\frac{x_j}{L*S}\right)^{g_{ij}} \right),$$

wherein:

$p_i$ is a unit price of an ith item in the item category, $x_i$ is horizontal facings of the ith item and is a positive number, L is a linear footage per shelf, S is a number of shelves for the item category, $a_i$, $b_i$ are parameters which are solved using the constrained linear regression model, $g_{ij}$ is a cross-space elasticity of the ith item on a jth item that is determined utilizing the multiple non-linear regression model; and $lb_i <= x_i <= ub_i$ in which $lb_i$ and $ub_i$ are respectively lower and upper bounds of horizontal facings of the ith item.

18. The system of claim 17, wherein the lower and upper bounds are derived from business constraints of 1.5 case pack and 3.5 days of supply (DOS), and 1 DOS safety stock, to eliminate over-stock and out-of-stock situations:

$$lb_i = \left\lceil \frac{\max(1.5\ CP, 1\ DOS\ \text{units})}{vf_i df_i} \right\rceil$$

$$ub_i = \left\lceil \frac{\max(1.5\ CP, 4.5\ DOS\ \text{units})}{vf_i df_i} \right\rceil + 1$$

in which 1 DOS units=median of historical daily sales, $vf_i$ and $df_i$ are respectively vertical and depth facings of the ith item for the shelf.

19. A non-transitory computer-readable storage medium having instructions stored which, when executed by a computing device, cause the computing device to perform operations comprising:

determining items of an item category;

generating a constrained linear regression model based on item demand and shelf-space of an item of the items;

generating space elasticity data by fitting the constrained linear regression model on the item demand of the item and a horizontal footage of the shelf-space associated with the item, wherein the item is a compliant item with respect to the constrained linear regression model;

generating a multiple non-linear regression model based on the constrained linear regression model, the item demand and an amount of non-zero shelf-space of other items of the items in a retail environment, the other items of the items in the retail environment including one or more replacement items of the item and each of the one or more replacement items being associated with either a substitute item or a complementary item, and wherein at least one of the one or more replacement items is a non-compliant item with respect to the constrained linear regression model;

generating cross-space elasticity data using the multiple non-linear regression model, the cross-space elasticity data indicating: (i) an increase in the item demand of the item in response to an increase in shelf-space of a first replacement item of the one or more replacement items in the item category, (ii) a decrease in the item demand of the item in response to an increase in shelf-space of a second replacementitem of the one or more replacementitems in the item category, (iii) a positive value representing a degree of the increase in the item demand of the item in response to the increase in shelf-space of the first replacement item, and (iv) a negative value representing a degree of the decrease in the item demand of the item in response to the increase in shelf-space of the second replacement item;

generating a non-linear multiple-constraint mixed integer optimization model based on the space elasticity data of the item and the cross-space elasticity data of the item;

generating a number of horizontal facings for the item of the items in the retail environment, using the non-linear multiple-constraint mixed integer optimization model, based on the space elasticity data of the item and the cross-space elasticity data of the item;

generating an electronic planogram of the item category for the retail environment, based on the number of horizontal facings associated with the item; and arranging the items in the retail environment according to the electronic planogram.

20. The medium of claim 19, wherein the constrained linear regression model comprises $Log(D)=log(a)+b*log(x)$, wherein D is the item demand of the item, x is the number of horizontal facings for the item on one or more shelves in the retail environment, a is a scale parameter being $=>0$, and b is the space elasticity of the item being $0<=b<=1$.

* * * * *